Patented Oct. 1, 1946

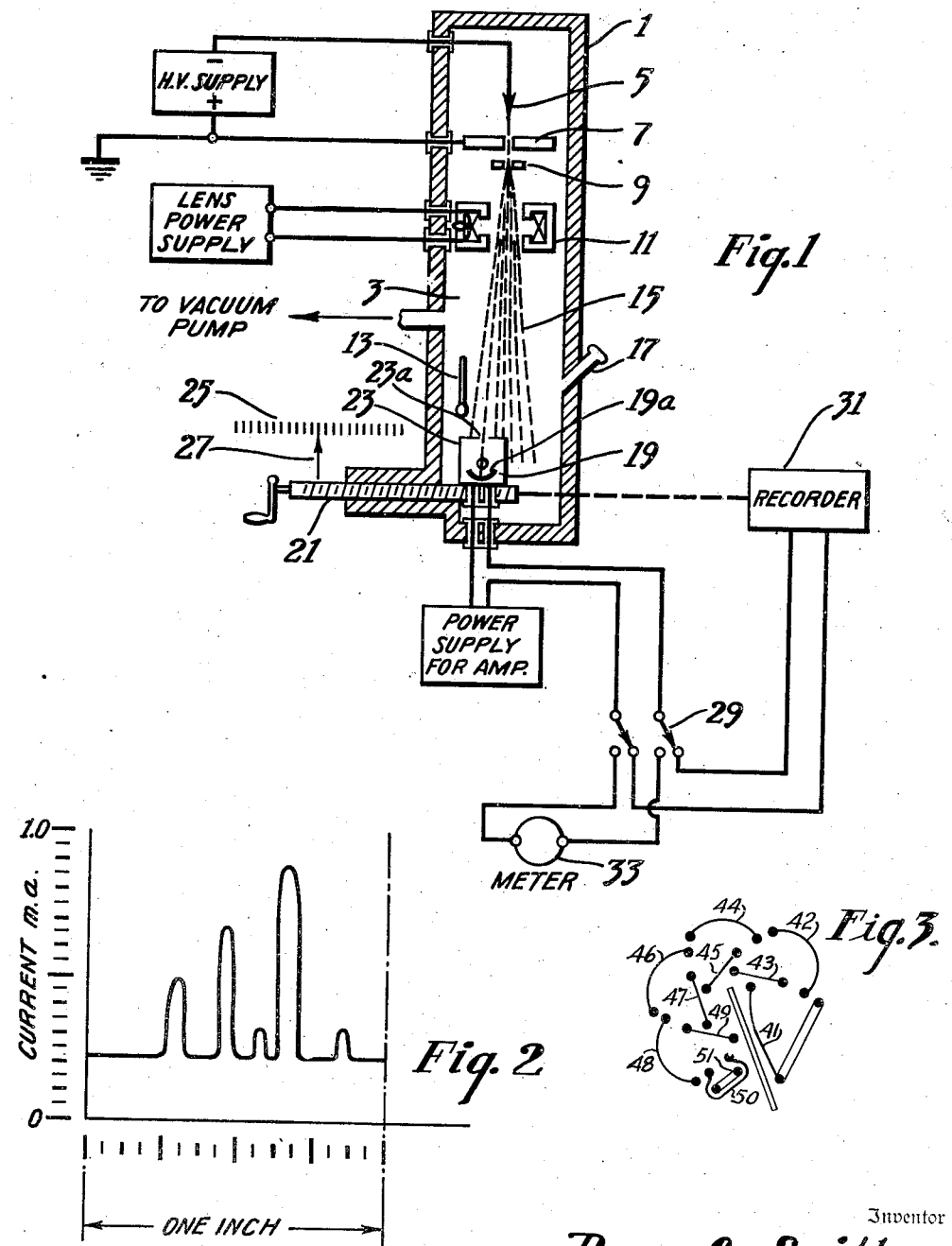

2,408,487

UNITED STATES PATENT OFFICE 2,408,487

ART OF ASCERTAINING THE ATOMIC STRUCTURE OF MATERIALS

Perry C. Smith, Moorestown, N. J., assignor to Radio Corporation of America, a corporation of Delaware Application February 29, 1944, Serial No. 524,424

4 Claims. (Cl. 250—49.5)

This invention relates to the art of ascertaining the atomic structure of materials and has special reference to the provision of an improved method of and means for producing, recording and interpreting diffraction patterns.

In the usual diffraction apparatus for determining the atomic structure of materials, the electrons or other rays (e. g., X-rays) which strike, are which emanate from, the specimen are focused upon a photographic plate or film. Properly interpreted, the spacing and intensity of the rings in the resulting photograpic image or "pattern" provide an indication of the atomic structure of the specimen and this makes it possible to ascertain changes in the specimen material when the said material is subjected to various treatments and chemical processes.

The examination and interpretation of such photographs requires the use of a precision instrument, such for example as a microphotometer, and can be entrusted only to the most skilled technicians. Further, such work is very tedious and is complicated and limited not only by human frailities and mechanical inaccuracies in the measuring instrument, but also by "light scattering" and other undesired phenomena peculiar to the particular photographic emulsion employed.

Accordingly, the principal object of the present invention is to obviate the foregoing and other less apparent objections to present day methods of and means for producing, recording and interpreting diffraction patterns.

As will hereinafter more fully appear, the objects of the present invention are achieved by producing a diffraction ray pattern in space, then translating the rays of which the pattern is comprised into an electric current (or voltage) of a value proportionate to the intensity of said rays at different points along a radius of said pattern and then plotting or otherwise recording a graph of said current as a function of said radius. The translation or conversion of the rays (of which the diffraction pattern is comprised) into an electric current is effected directly or by means of a secondarily-emissive electrode assembly and the plotting and recording of the current may be done either manually, with the aid of a suitable meter, or automatically as by means of a facsimile recorder or analogous device. In any event, the resulting graph or curve contains all of the information required to be known in the interpretation of a diffraction pattern and may be read by an unskilled observer without the aid of additional equipment.

Certain details of procedure and construction, together with other objects and advantages will be apparent and the invention itself will be best understood by reference to the following specification and to the accompanying drawing, wherein:

Figure 1 is a schematic view of an electron diffraction "camera" embodying the invention and including certain auxiliary translating and recording apparatus, Figure 2 is a graph of a diffraction pattern produced in the "camera" of Fig. 1, and Fig. 3 is a schematic view showing the arrangement of the electrodes of the electron multiplier "pick-up" in the diffraction instrument of Fig. 1.

In Fig. 1 of the drawing there is shown an electron diffraction camera, indicated generally at 1, comprising an evacuable chamber 3 containing a cathode 5, a beam forming anode 7, a specimen holder 9, an electron lens system (exemplified by an electro-magnet) 11 and a pivoted fluorescent screen or cassette 13, all arranged in spaced array in the order named along the central axis of the chamber 3. The elements thus far described may be of any conventional design (see for example U. S. Patent No. 2,275,234) and are adapted to produce a beam 15 made up of electrons diffracted from the specimen. As is well known to those skilled in the art, the invisible rays of which the beam 15 is comprised, are converted into a visible image of the diffraction ray pattern when the plate 13 is moved into the path of said rays or "beam." In the instant case however, the screen or plate 13 is shown swung upwardly out of the path of the beam; thus, the only diffraction pattern now present within the vacuum chamber 3 exists merely in space. (Such a pattern would be invisible to an observer looking into the chamber through one of the viewing windows or ports 17 with which the "camera" is provided.)

In carrying the present invention into effect, the evacuable chamber 3 is provided with an electronic amplifier device 19 such for example as the electrode assembly of an "electron multiplier" (say an RCA type 931A), capable of converting the rays 15 of which the diffraction pattern is comprised into an electric current (or voltage) of a value proportionate to the intensity of said rays. This electrode assembly 19 is mounted for movement as on a micrometer screw 21 along a radius of the beam and is provided with a mask 23 having a slot 23a therein which is arranged in register with the first multiplying stage 41 of the device. The vacuous space about the amplifier 19 and in the chamber 3 is continuous; hence the rays 15 which pass through the open slot 23a impinge directly upon the electrode 41 and generate a secondary-electron current proportionate to the intensity of the rays at the particular point on the radius of the image to which the said electrode 41 is presented. As indicated in Fig. 3 the secondary-electrons emitted from the "cathode" 41 are directed by fixed electrostatic fields along fixed paths to the dynode (secondary-emitter) 42. The electrons impinging on this dynode surface produce many other electrons, the number depending on the energy of the impinging electrons. These secondary electrons are then directed to the next dynode 43 and knock out more new electrons. This multiplying process is repeated in each successive stage (44 to 50 inclusive) until those emitted from the last dynode, 50, are collected by the anode 51 and constitute the current utilized in the output circuit.

The relative position of the amplifier 19 along the radius of the diffraction pattern 15 is indicated upon a scale 25 which is read in conjunction with a pointer 27 on the screw 19. The output of the amplifier 19 is shown connected through a switch 29 to a recorder 31 which will be understood to be driven in synchronism with the screw 21. The recorder 31 thus automatically plots a graph or curve showing the current generated by the amplifier 19 as a function of the radius of the diffraction pattern 15. Alternatively, the output of the translating device 19 may be connected through the switch 29 to a suitable meter 33, and the meter readings plotted against the scale 25. In either event a graph (see Fig. 2), is obtained which shows the relative intensity and spacing of the diffraction rings and thus contains all of the information necessary to be known in the interpretation of a diffraction pattern. The ordinate of the curve of Fig. 2 and the markings of the scale 25 Fig. 1, are shown calibrated in fractions of an inch; obviously, however, they may be calibrated in Angstrom units of atomic spacing, if desired.

From the foregoing it is apparent that the present invention provides a simple and reliable method of and means for producing recording and interpreting diffraction patterns.

I claim as my invention:

1. In combination, means for producing a diffraction ray pattern of a specimen in a plane spaced from said specimen, means mounted for movement along a radius of said pattern for converting the diffracted rays which fall along said radius into an electromotive force, and means for measuring said electromotive force as a function of said radius.

2. In combination, means for producing a diffraction ray pattern of a specimen in a plane spaced from said specimen, means mounted for movement along a radius of said pattern for converting the diffracted rays which fall along said radius into an electric current, and means for recording a graph of said current as a function of said radius.

3. Electron diffraction apparatus comprising an evacuable chamber containing means for creating an electron beam and for directing said beam upon a specimen, an electron lens for forming the electrons diffracted from said specimen into an electron diffraction pattern and for projecting said pattern toward a plane in said evacuable chamber, a secondary-electron emissive amplifier mounted for movement in said plane along a radius of said diffraction pattern and responsive to the impress of said diffracted electrons thereon, means for moving said amplifier along said radius in said plane, and means for indicating the output of said amplifier.

4. The invention as set forth in claim 3 and wherein said indicating means is of the recording type and is adapted to record the output of said amplifier as a function of the radius of said electron diffraction pattern.

PERRY C. SMITH.